No. 805,978. PATENTED NOV. 28, 1905.
A. C. MENGES.
TRANSMISSION GEAR.
APPLICATION FILED SEPT. 14, 1904.

Witnesses
Edward W. Morrow.
Mary S. Tooker

Albert C. Menges Inventor
by Edward Taggart
his Attorney

UNITED STATES PATENT OFFICE.

ALBERT C. MENGES, OF GRAND RAPIDS, MICHIGAN, ASSIGNOR TO WILLIAM HARRISON, OF GRAND RAPIDS, MICHIGAN.

TRANSMISSION-GEAR.

No. 805,978.        Specification of Letters Patent.        Patented Nov. 28, 1905.

Application filed September 14, 1904. Serial No. 224,458.

*To all whom it may concern:*

Be it known that I, ALBERT C. MENGES, a citizen of the United States, residing at Grand Rapids, in the county of Kent and State of Michigan, have invented new and useful Improvements in Transmission-Gears, of which the following is a specification.

This invention relates to certain new and useful improvements in transmission-gears; and the invention consists in the combination and arrangement of parts hereinafter described and claimed.

The objects of the invention are, first, to furnish a cheap and efficient means for the transmission of power from one shaft to another, as hereinafter described; second, to bring into position the gears on different shafts, so that the gear on one shaft will engage with the gear on the other with the least possible strain on the gear; third, to combine with two shafts two friction disks or gears for giving the proper rotary motion to each shaft in order to bring into suitable position the gear on one shaft to engage with its corresponding gear on the other shaft; fourth, other objects hereinafter pointed out and claimed. These objects I accomplish by means of the mechanism illustrated in the accompanying drawings, in which—

Figure 2:
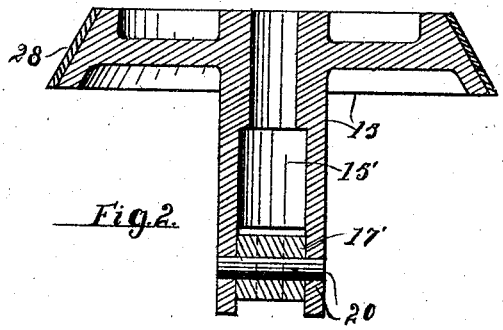
Figure 1:
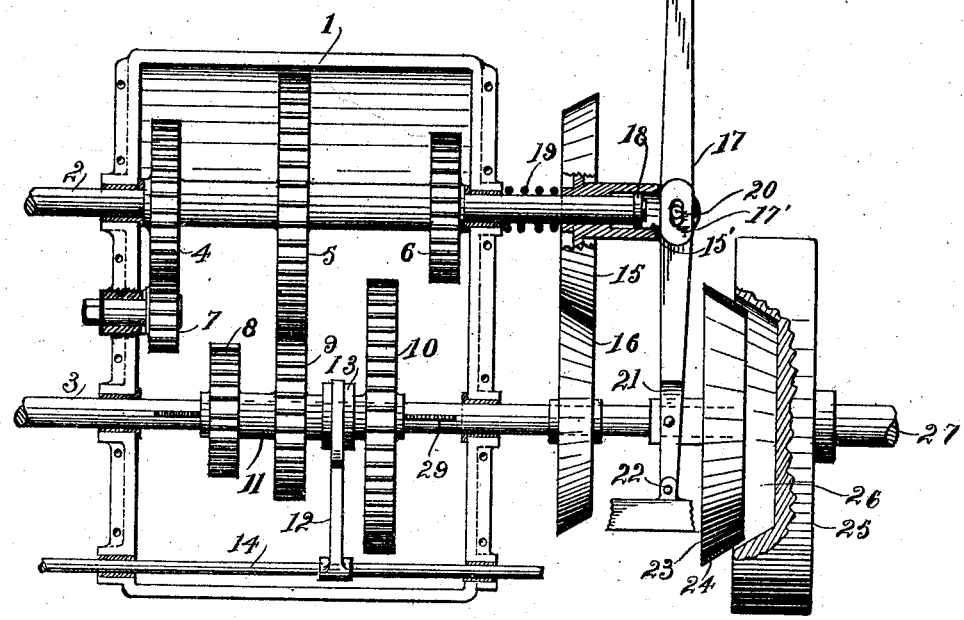

Figure 1 is a side elevation of the mechanism constructed in accordance with my invention for the transmission of power. Fig. 2 is a sectional view of one of the friction-gears, the same being shown on an enlarged plan.

Like numerals refer to like parts throughout both views.

1 shows the supporting frame or case which supports the two shafts carrying the gear and other mechanism.

2 is what I term the "secondary speed-shaft," which is placed parallel with the main speed-shaft 3.

4, 5, and 6 are gear-wheels on the secondary shaft arranged to be brought into engagement with the gear on the main shaft, as hereinafter described.

7 is an intermediate gear used for reversing the motion of the secondary shaft. It is supported in any suitable manner upon the frame and is shown in engagement with the gear 4.

8, 9, and 10 are gears on the main shaft 3, they being supported upon the sliding sleeve 11, which sliding sleeve 11 is keyed by the key 29 to the main shaft.

In the drawings I have shown three cog-wheels on the secondary shaft and three cog-wheels on the main shaft; but it will be understood that the number of gears may be increased or decreased and that the size of the gear may be increased or decreased at pleasure without departing from the invention.

12 is an arm rigidly secured to the longitudinally-moving shaft or rod 14 and engaging with the collar 13 on the sleeve 11, the rod 14 having a longitudinal movement for the purpose of moving the collar and sleeve 11 and with the sleeve 11 the gear-wheels 8, 9, and 10 for the purpose of engaging and disengaging with the gear-wheels on the secondary shaft.

15 is the friction-disk on the shaft 2.

15' is an enlarged portion of the opening through the friction-disk 15 for the purpose of receiving the collar 18.

16 is a friction-disk on the lower shaft 3, which is adapted to engage with the disk 15 when the two shafts 2 and 3 are brought into rotation prior to the engagement of the gears on said shafts.

17 is a lever for moving the disk 15 and also for moving the clutch 23.

18 is a collar on the shaft 2 to prevent the disk 15 from pulling off from the shaft.

17' is a sleeve on the stud 20, as shown in Fig. 2.

19 is a coiled spring placed between the disk 15 and a shoulder on the case, the object of the spring being to automatically disengage the disks 15 and 16 after the engagement of the cogs on the shafts 2 and 3.

20 is a stud on the disk 15, which engages with the lever 17.

21 is the forked portion of the lever 17, which engages with the friction-clutch 23.

22 is the pivotal point of the lever 17.

23 is the friction-clutch mounted on the main shaft 3.

24 is a frictional band or covering on the periphery of the clutch or disk 23.

25 is the fly-wheel of the engine mounted on the driving-shaft 27.

26 is the frictional part of the fly-wheel, which engages with the clutch 23.

28 is the friction band or covering for the disk 15.

The operation of my invention is as follows: The driving-shaft 27 being in motion and the gears on the shaft 3 having been shifted so that the gear 8 meshes with gear 7, the latter meshing with gear 4 on said shaft 2 will impart motion to said shaft 2 from the shaft 3 and will cause the same to rotate in the same direction as shaft 3 when the latter is coupled to the said driving-shaft. The teeth on the various gears are so arranged that when the shafts 2 and 3 are at a standstill if a gear on shaft 3 is moved out of mesh with a gear on shaft 2 the other gears on shaft 3 will be in proper angular position to be moved into mesh with their corresponding gears. The shifting of the gears is accomplished by moving the sliding sleeve 11 by means of the longitudinally-moving rod 14 and arm 12, as above described. By this means the gear 10 on the shaft 3 may be brought into engagement with gear 6 on shaft 2, thereby giving a rapid motion to the gear 6 and its shaft, or the gear 9 may be brought into contact with the gear 5, giving a slow movement to the shaft 2, or the gear 8 may be brought into contact with the intermediate gear 7, conveying a reverse motion to the gear 4 and shaft 2. As soon as the connection is made between the gears on shaft 2 and the shaft 3 and by means of the lever 17 the clutch 24 is engaged with the fly-wheel 25 and the friction-disks 15 and 16 are disengaged motion is conveyed directly from the driving-shaft 27 to the shaft 2 through the shaft 3. The clutch 24 may be disconnected from the fly-wheel without engaging the friction-wheels 15 and 16, and when the lever 17 is moved far enough to make the engagement between the friction-disks 15 and 16 the shafts will then move by their own momentum at such speed as the main shaft then has, whether the same be used in connection with an automobile or other mechanical power.

By the construction above described the power is transmitted from shaft 3 to shaft 2 with the least possible strain upon the gearing, and at the same time the friction mechanism for rotating the two shafts simultaneously is disengaged.

Having thus described my invention, what I claim to have invented, and desire to secure by Letters Patent, is—

1. In a transmission-gear, the combination of a main shaft and a secondary shaft, driving-gears carried by each shaft, friction-disks upon the shafts adapted to engage with one another and mechanisms for engaging and disengaging the disks and for moving the gears on one of the shafts.

2. The combination with a main shaft, a secondary shaft, gears on the shafts having operative engagement, friction-disks on the shafts, suitable mechanism for throwing the friction-disks into and out of engagement, and means for moving the gears on the main shaft into and out of engagement with the gears on the secondary shafts.

3. In combination with a main shaft and driving-shaft, a sleeve, gears secured thereto and keyed to the main shaft so the said sleeve and gears may be moved longitudinally thereon, means for giving a longitudinal movement to said sleeve and gears, a secondary shaft, gears on the secondary shaft in position to be engaged by the gears on the main shaft, said shafts having frictional disks thereon, means for engaging and disengaging said friction-disks and means coöperating therewith for engaging and disengaging the main shaft with the driving-shaft.

In testimony whereof I have hereunto set my hand in presence of two subscribing witnesses.

ALBERT C. MENGES.

Witnesses:
 EDWARD TAGGART,
 MARY S. TOOKER.